United States Patent [19]

Arnold

[11] 4,019,647

[45] Apr. 26, 1977

[54] ELECTRICAL WIRING BOX WITH ATTACHED MOUNTING ELEMENTS

[75] Inventor: William O. Arnold, Parkersburg, W. Va.

[73] Assignee: Union Insulating Company, Parkersburg, W. Va.

[22] Filed: Oct. 14, 1975

[21] Appl. No.: 621,772

[52] U.S. Cl. .............................. 220/3.3; 151/41.75; 174/58; 220/3.6
[51] Int. Cl.[2] ....................................... H02G 3/08
[58] Field of Search ............ 220/3.2, 3.94; 174/54, 174/58; 248/27 R, 27 A, DIG. 6; 24/73 B; 151/41.75

[56] References Cited

UNITED STATES PATENTS

| | | | |
|---|---|---|---|
| 1,482,865 | 2/1924 | Raus | 174/58 |
| 2,348,318 | 5/1944 | Austin, Jr. | 220/3.3 |
| 2,374,622 | 4/1945 | Rugg | 174/58 |
| 2,397,637 | 4/1946 | Bell | 248/DIG. 6 |
| 2,769,562 | 11/1956 | Rudolph | 220/3.4 |
| 3,575,313 | 4/1971 | Trachtenberg et al. | 220/3.3 |
| 3,633,782 | 1/1972 | Bellinger | 220/3.5 |
| 3,770,872 | 11/1973 | Brown | 174/53 |
| 3,876,821 | 4/1975 | Pringle | 220/3.4 X |
| 3,952,475 | 4/1976 | Paskert | 220/3.4 X |
| R21,769 | 4/1941 | Tinnerman | 151/41.75 X |

*Primary Examiner*—Stephen Marcus
*Attorney, Agent, or Firm*—Peter Xiarhos; Elmer J. Nealon; Norman J. O'Malley

[57] ABSTRACT

An electrical wiring box having a pair of mounting elements attached thereto for use in mounting the wiring box within an opening in a supporting structure such as wallboard or panelling. The wiring box includes first and second mounting portions each having a pair of spaced slots therein. Each of the mounting elements includes a pair of locking tabs and a flat portion having openings therein connected with the locking tabs. The locking tabs are adapted to be inserted into the pair of slots in the corresponding one of the mounting portions for attaching the mounting element to the wiring box. The flat portion is adapted to receive fasteners in the openings therein for mounting the wiring box to a supporting structure.

10 Claims, 6 Drawing Figures

ELECTRICAL WIRING BOX WITH ATTACHED MOUNTING ELEMENTS

BACKGROUND OF THE INVENTION

The present invention relates to an electrical wiring box and, more particularly, to an electrical wiring box having mounting elements attached thereto for use in mounting the wiring box within an opening in a supporting structure such as wallboard or panelling.

Mounting elements for use in mounting electrical wiring boxes within openings in supporting structures are well known to those skilled in the art. By way of example, in each of U.S. Pat. Nos. 2,917,199 and 3,410,582 there is disclosed a pair of metal mounting elements which are adjustably attached by metal screws to the top and bottom walls of a metal electrical wiring box, each of the mounting elements having a pair of openings therein for receiving fasteners (e.g., screws) for mounting the wiring box to a supporting structure. Similarly, in U.S. Pat. No. 3,210,458 there is disclosed a pair of metal mounting elements which are permanently molded into a plastic wiring box adjacent to the top and bottom walls of the wiring box, openings also being provided in these mounting elements for receiving fasteners for mounting the wiring box to a supporting structure.

While the abovedescribed mounting elements are quite satisfactory for mounting wiring boxes to supporting structures, the techniques by which these mounting elements are attached to the wiring boxes during the manufacture of the wiring boxes have certain drawbacks. In particular, in the case of metal mounting elements, it is costly and time consuming to attach these mounting elements to wiring boxes by the use of metal screws, especially in the case of plastic wiring boxes, inasmuch as this involves either drilling openings or forming threaded openings in the top and bottom walls of the boxes and then threading screws into the openings. Further, it is not practical to use metal mounting elements in situations, as in the present invention, where adjustability of the mounting elements is not necessary. In addition, there is always the possibility that the mounting elements will not be properly attached to wiring boxes or will fit loosely with the boxes due to the possible inadvertent loosening of the screws. In the case of metal mounting elements molded into a plastic wiring box, the molding of these mounting elements into the wiring box is a time-consuming operation and increases the total molding time required for the manufacture of the wiring box. Furthermore, the "molding in" of metal mounting elements requires careful attention and supervision by a skilled operator of the molding equipment.

BRIEF SUMMARY OF THE INVENTION

In accordance with the present invention, a box assembly is provided which avoids the drawbacks of prior art arrangements as described hereinabove. The box assembly in accordance with the present invention generally comprises a box, such as an electrical wiring box, and a mounting member used with the box for mounting the box to a supporting structure. The box includes a plurality of walls arranged to define a space for receiving a device in the space and further includes a mounting portion extending away from one of the walls. The mounting portion has a first surface and a second surface and has an opening extending therethrough from the first surface to the second surfae. The mounting member used with the abovedescribed box includes a locking element inserted within the opening in the mounting box. The locking element has a projection arranged to abut against the second surface of the mounting portion following the insertion of the locking element into the opening thereby to secure the mounting member of the box. The mounting member further includes a portion connected with the locking element for use in mounting the box to a supporting structure.

BRIEF DESCRIPTION OF THE DRAWINGS

Various objects, features and advantages of an electrical wiring box in accordance with the present invention will be apparent from the following detailed description taken in conjunction with the accompanying drawing in which.

DETAILED DESCRIPTION OF THE INVENTION

Figure 1:
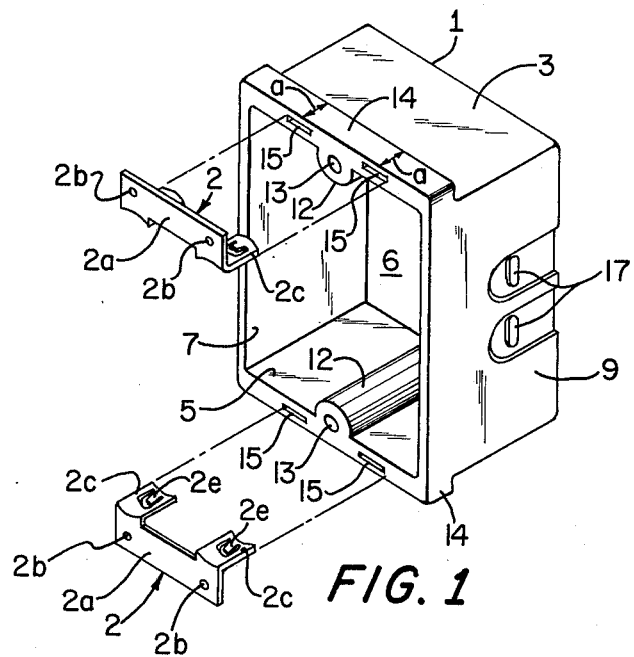
FIG. 1 is an exploded view illustrating an electrical wiring box used in conjunction with a pair of mounting elements in accordance with the present invention for mounting the wiring box to a supporting structure.
Figure 2:
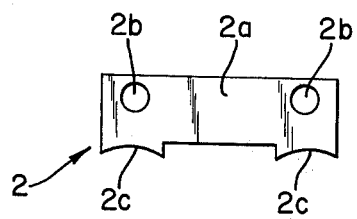
FIGS. 2, 3 and 4 are front, top and side views, respectively, of a mounting element in accordance with the invention.

Referring now to FIG. 1, there is shown in an exploded view an assembly including an electrical wiring box 1, for example, of a molded phenolic plastic composition, as employed in accordance with the present invention with a pair of mounting elements 2. As shown in FIG. 1, the electrical wiring box 1 includes a top wall 3, a bottom wall 5, a rear wall 6, and a pair of side walls 7 and 9. These walls define an opening at the front of the wiring box 1 and further enclose a space or volume for receving an electrical device such as an electrical switch or receptacle as well as wires and other electrical connections associated with the electrical device. The electrical device is secured to the wiring box 1 by means of a pair of bosses 12 formed integrally with the walls 3 and 5, these bosses having openings 13 formed therein for receiving fasteners (e.g., threaded screws) for securing the electrical device to the bosses 12. The side wall 9 further includes knockout elements 17 which may be removed selectively as desired to make electrical connections to an electrical device which is to be mounted within the wiring box 1.

The wiring box 1 further includes a pair of rims 14 integral with and extending normally from the top and bottom walls 3 and 5. Each of the rims 14 has a pair of generally-rectangular shaped openings or slots 15 therein on opposite sides of a corresponding one of the boss openings 13, each of the openings 15 having a depth "a," as shown in FIG. 1, equal to the depth of the rims 13. As indicated in FIG. 1, the mounting elements 2 are used with the openings 15 for securing the mounting elements 2 to the wiring box 1.

Figure 4:
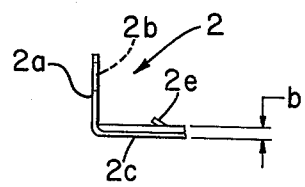
Figure 3:
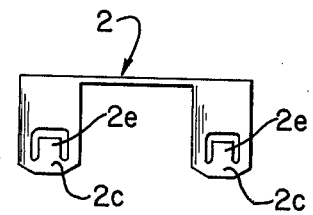
Figure 5:
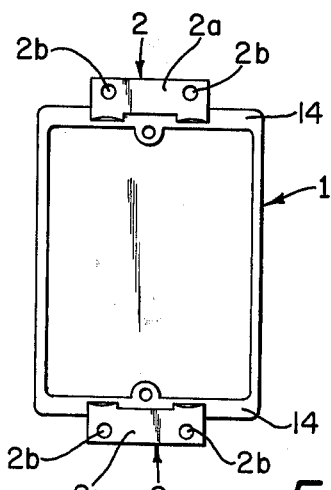
FIGS. 5 and 6 are front and top views, respectively, of the electrical wiring box shown in FIG. 1 as assembled together with the mounting elements in accordance with the invention.
Figure 6:
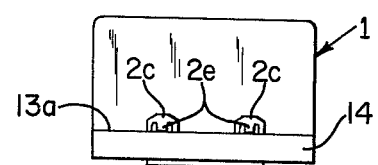

As shown in FIGS. 1-4, each of the mounting elements 2, typically of stamped sheet metal, includes a flat portion 2a having a pair of spaced openings 2b therein and a pair of slightly-bowed or arched tabs 2c integral with and generally normal to the flat portion 2a. The tabs 2c of the mounting elements are locking elements and are adapted to be inserted into the openings 15 in the rims 14 of the wiring box 1 to secure the mounting elements 2 to the wiring box 1. As best shown in FIGS. 3 and 4, each of the tabs 2c has a small locking tip 2e extending outwardly therefrom at a small angle and in a direction toward the plane of the flat portion 2a. The tabs 2c are dimensioned so that when they are forced into the openings 15 in the rims 14, the locking tips 2e thereof become slightly compressed as they pass through the openings 15 and expand outwardly again when they emerge from the rear of the openings 15. When the tabs 2c are fully inserted into the openings 15, the tips 2e abut against rear surfaces 13a of the rims 14, as indicated in FIG. 6, thereby locking the mounting elements 2 securely to the wiring box 1. The locking of the mounting elements 2 to the wiring box 1 is enhanced by the slightly-bowed or arched nature of the locking tabs 20, the maximum height of these tabs, shown at b in FIG. 4, being essentially equal to the height of the openings 15 in the rims 14 thereby to establish a tight fit for the tabs 2c within the openings 15 when the tabs 2c are forced into the openings 15.

The wiring box 1 as described hereinabove is mounted to a supporting structure, for example, to wallboard or panelling, by using the aforementioned flat portions 2a of the mounting elements 2. More specifically, the wiring box 1 is first inserted in a conventional fashion into a rectangular opening in the supporting structure and then secured to the supporting structure by inserting screws (not shown) within the openings 2b in the flat portions 2a of the mounting elements 2 and threading the screws into the supporting structure.

The abovedescribed openings or slots 15 in the rims 14 may be formed in the rims 14 during the course of the molding of the other portions of the wiring box 1. The mounting elements 2 may then be attached to the wiring box 1, in the manner described hereinabove, as part of an operation separate and apart from the molding operations. In this manner, the molding time associated with the wiring box 1 is not unduly extended and the need to provide careful supervision of the "molding in" of mounting elements by skilled personnel is eliminated.

While there has been described what is considered a preferred embodiment of the invention, it will be obvious to those skilled in the art that various changes and modifications may be made therein without departing from the invention as called for in the appended claims.

What is claimed is:

1. A box assembly adapted to be mounted to a supporting structure, comprising:

A box including a plurality of walls arranged to define a space for receiving a device in said space, said box further including a mounting portion extending generally transversely from one of the walls and having a first surface and a second surface, said mounting portion having an opening extending therethrough from the first surface to the second surface, said opening having a predetermined height in the direction of the mounting portion and being surrounded by the material of the mounting portion; and a mounting member comprising:

a unitary bowed locking element having a maximum height essentially equal to the height of the opening in the mounting portion, said locking element being disposed within the opening in the mounting portion with a point along its bowed surface abutting against an inner surface of the opening thereby to retain the locking element within the opening;

a projection extending outwardly from the bowed surface of the locking element at an acute angle and having a free end, said projection being outside of the opening in the mounting portion with the free end thereof abutting angularly against the second surface of the mounting portion along a line generally transverse to the aforesaid one of the walls of the box following the insertion of the locking element into the opening, said free end of the projection facing in a direction toward the first and second surfaces of the mounting portion; and a portion connected with the locking element for use in mounting the box to a supporting structure.

2. A box assembly in accordance with claim 1 wherein:

the opening in the mounting portion of the box is generally rectangular in configuration 3. A box assembly in accordance with claim 2 wherein:

the portion connected with the locking element is generally normal to the locking element and includes an opening for receiving a fastener for use in mounting the box to a supporting structure.

4. A box assembly in accordance with claim 2 wherein:

the box is of a plastic composition.

5. A box assembly adapted to be mounted to a supporting structure, comprising:

a box including a plurality of walls arranged to define a space for receiving a device in said space, said box further including first and second mounting portions extending generally transversely from predetermined walls of the box and each mounting portion having a front surface and a rear surface, each mounting portion having an opening extending therethrough from the front surface to the rear surface, said openings having a predetermined height in the direction of the mounting portions and being surrounded by the material of the mounting portions;

a first mounting member including:

a unitary bowed locking element having a maximum height essentially equal to the height of the opening in the first mounting portion, said locking element being disposed within the opening in the first mounting portion with a point along its bowed surface abutting against an inner surface of the opening thereby to retain the locking element within the opening; and a projection extending outwardly from the bowed surface of the locking element at an acute angle and having a free end, said projection being outside of the opening in the first mounting portion with the free end thereof abutting angularly against the rear surface of the first mounting portion along a line generally transverse to the wall of the box from which the first mounting portion extends following the insertion of the locking element into the opening, said free end of the projection facing in a direction toward the front and rear surfaces of the first mounting portion; and a second mounting member including:

a unitary bowed locking element having a maximum height essentially equal to the height of the opening in the second mounting portion, said locking element being disposed within the opening in the second mounting portion with a point along its bowed surface abutting against an inner surface of the opening thereby to retain the locking element within the opening; and a projection extending outwardly from the bowed surface of the locking element at an acute angle and having a free end, said projection being outside of the opening in the second mounting portion with the free end thereof abutting angularly against the rear surface of the second mounting portion along a line generally transverse to the wall of the box from which the second mounting portion extends following the insertion of the locking element into the opening, said free end of the projection facing in a direction toward the front and rear surface of the second mounting portion;

said first and second mounting members further including first and second portions connected with the locking elements of the first and second mounting members, respectively, for use in mounting the box to a supporting structure.

6. A box assembly in accordance with claim 5 wherein:

the openings in the first and second mounting portions of the box are generally rectangular in configuration.

7. A box assembly in accordance with claim 6 wherein:

the portions connected with the locking elements are generally normal to the locking elements and include openings for receiving fasteners for use in mounting the box to a supporting structure.

8. A box assembly adapted to be mounted to a supporting structure, comprising:

a box including a plurality of walls arranged to define a space for receiving a device in said space, said box further including first and second mounting portions extending generally transversely from predetermined walls of the box and each mounting portion having a front surface and a rear surface, each mounting portion having first and second spaced openings extending therethrough from the front surface to the rear surface, said openings having a predetermined height in the direction of the mounting portions and being surrounded by the material of the mounting portions;

a first mounting member including:

first and second unitary bowed locking elements having maximum heights essentially equal to the heights of the openings in the first mounting portion, said first and second locking elements being disposed, respectively, within the first and second openings in the first mounting portion with points along the bowed surfaces of the locking elements abutting against inner surfaces of the first and second openings thereby to retain the locking elements within the first and second openings; and projections extending outwardly from the bowed surfaces of the first and second locking elements at acute angles and having free ends, said projections being outside of the first and second openings in the first mounting portion with the free ends thereof abutting angularly against the rear surface of the first mounting portion along lines generally transverse to the wall of the box from which the first mounting portion extends following the insertion of the locking elements into the first and second openings of the first mounting portion, said free ends of the projections facing in a direction toward the front and rear surfaces of the first mounting portion; and a second mounting member including:

first and second unitary bowed locking elements having maximum heights essentially equal to the heights of the openings in the second mounting portion, said first and second locking elements being disposed, respectively, within the first and second openings in the second mounting portion with points along the bowed surfaces of the locking elements abutting against inner surfaces of the first and second openings thereby to retain the locking elements within the first and second openings; and projections extending outwardly from the bowed surfaces of the first and second locking elements at acute angles and having free ends, said projections being outside of the first and second openings in the second mounting portion with the free ends thereof abutting angularly against the rear surface of the second mounting portion along lines generally transverse to the wall of the box from which the second mounting portion extends following the insertion of the locking elements into the first and second openings of the second mounting portion, said free ends of the projections facing in a direction toward the front and rear surfaces of the second mounting portion;

said first and second mounting members further including portions connected with the locking elements thereof for use in mounting the box to a supporting structure.

9. A box assembly in accordance with claim 8 wherein:

the first and second openings in the first and second mounting portions of the box are generally rectangular in configuration.

10. A box assembly in accordance with claim 9 wherein:

the portions connected with the locking elements of the first and second mounting members are generally normal to the locking elements and include openings for receiving fasteners for use in mounting the box to a supporting structure.

* * * * *